Nov. 7, 1950     T. H. MAYFIELD     2,528,897
COTTON CHOPPER AND BEET TOPPING DEVICE
Filed Jan. 10, 1947
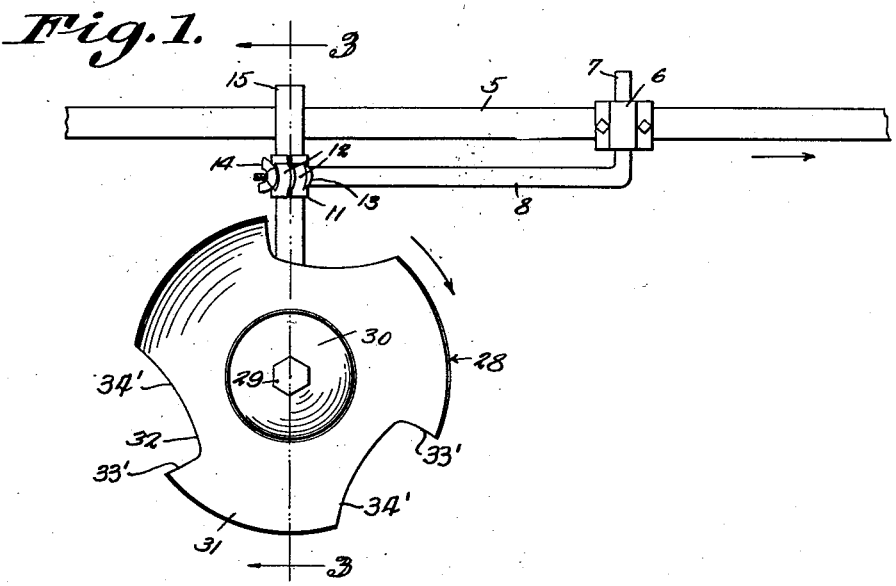
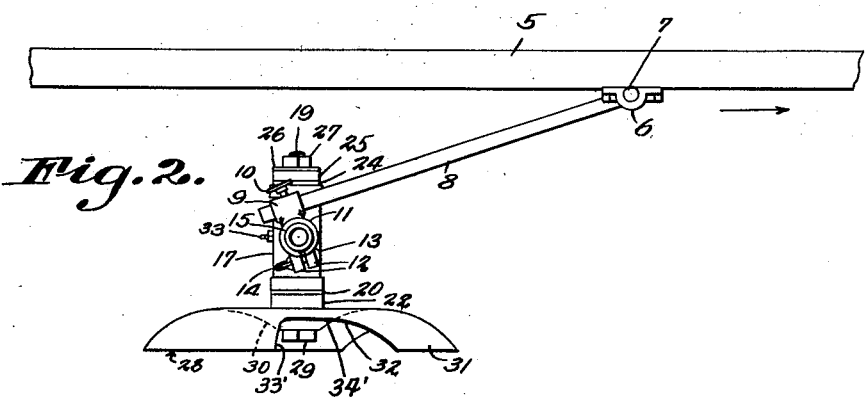
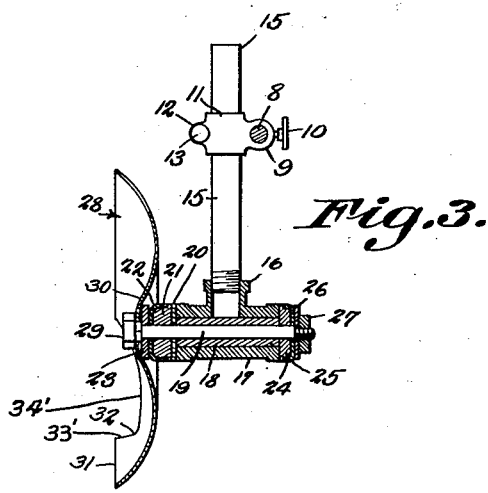
Inventor
T. H. Mayfield
By C. B. Knowles
Attorneys Patented Nov. 7, 1950

2,528,897

UNITED STATES PATENT OFFICE 2,528,897

COTTON CHOPPER AND BEET TOPPING DEVICE

Thomas H. Mayfield, Roby, Tex.

Application January 10, 1947, Serial No. 721,253

1 Claim. (Cl. 97—213)

This invention relates to cultivating devices, and more particularly, has reference to devices of this type that are particularly adapted for use in chopping or cultivating cotton, and for removing the tops of sugar beet plants.

The primary object of the invention is to provide a device of the character described that may be detachably connected in desired number to the beam of a conventionally constructed cultivator, and which is so constructed as to formation and arrangement of parts, as to efficiently fulfill its functions without the necessity of added machinery or man power, as has heretofore been the case.

A further object of the invention is to provide a cultivating device which is extremely simple in construction, and yet unusually durable, and which embodies a minimum of parts, thereby permitting a considerable reduction of expense involved in cultivating operations of the type described.

Briefly, the invention includes rotary cutting blades of novel formation, that are attachable to a cultivator beam by means which permit their efficient use on level, ridge, or lister furrow rows, and which further permit the adjustable positioning of the blades in a large range of angular positions, so that the blades may efficiently perform their functions on plants of various height, and thicknesses.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1 is a side elevational view of a cultivating device constructed in accordance with the invention, attached to the beam of a cultivator.

Figure 2 is a top plan view.

Figure 3 is a view taken substantially on line 3—3 of Figure 1.

Referring to the drawing in detail, 5 denotes the beam of a cultivator, which may be of conventional construction, of the one, two, or four row type, used in cultivating drill row crops, that are grown at a unit to a row.

Attachable to the beam 5, by the conventionally formed clamp 6 is the upstanding end portion 7 of an extension arm 8 that is extended from the end portion horizontally, and at any angle to the beam that is best suited for the particular task.

The other end of the extension arm 8 is extended through the sleeve 9 of a two-way clamp, and in this sleeve the arm may be gripped in fixed relation to the clamp by application of lock screw 10, that is threadable against the extension arm 8 through a suitable opening in the wall of the sleeve 9.

The two-way clamp is also provided with a clamping sleeve 11, which is preferably formed integral with the sleeve 9, and is at a right angle thereto. The sleeve 11, as may be clearly seen by reference to Figure 1, is split or parted longitudinally, and is provided with opposed ears 12 through which is threadable a bolt 13, provided with wing nut 14.

Through the clamping sleeve 11 is extended one end of the share standard 15. This may be secured in desired positions of vertical adjustment by tightening of the sleeve 11 there-around, by means of the bolt 13 cooperating with wing nut 14.

The other end of the standard 15 is threaded, for engagement with threaded nipple 16, that projects at a right angle to, and is formed integrally with, cylindrical bearing sleeve 17.

Within the bearing sleeve 17 is provided a bushing 18, in which is rotatable the shaft 19. In inserting the shaft 19 into the bushing 18, the shaft is first extended through washer 20, gasket 21, that is held in place by pack washer 22, and washer 23.

The other end of the shaft 19 projects from the bearing sleeve 17 and is threaded, as clearly shown in Figure 3, this end being extended through gasket 24 held in place by pack washer 25, and through washer 26, all of which are held in place by nut 27 threaded on the end of the shaft 19.

Carried by the shaft 19 is the rotary blade or share 28. This is formed with a squared centrally disposed opening, the shaft 19 being correspondingly squared adjacent its head 29, so that the blade 28 will rotate on rotation of the shaft, this construction being most clearly shown by Figure 3.

The rotary blade 28 is circular, with a raised hub portion 30, and with a wide marginal portion 31 that is of dished formation.

In my cotton chopping device, the periphery of the marginal portion 31 is cut away at intervals to provide spaced indentations 32, which as shown clearly by Figure 1, are preferably formed substantially angularly. One edge 33' of each indentation is substantially radial of the disc and defines the leading edge of the blade or share 28 next following the indentation; the other edge 34' of each indentation meets the edge 33' at an obtuse angle, and extends in a gradual curve to intersect with the trailing edge of the blade next preceding, the curve of the edge 34' being opposite to the curvature of the outer edges of the blades, which outer edges, as may be noted from Fig. 1, are outcurved and are all struck upon a common center.

The edge of the marginal portions that is not cut away is sharpened to provide a cutting edge or knife, while the edges of the indentations 32 are allowed to remain unsharpened.

For topping sugar beets, the blade 28 is in conformation similar to that described above for chopping cotton, with the exception that the edges of the indentations 32 are sharpened, providing a continuous cutting edge on the blade.

Preferably, a cap 33 is threadable into a cooperating opening in the side wall of the bearing sleeve 17, and there is provided in the cap a bore, there being another bore provided in the bushing 18, that is a continuation of the bore in the cap, so that oil may be fed to the shaft 19 for proper lubrication thereof.

In use of my device, any number of blades 28 may be used as desired, depending on the particular type of cultivator to which they are to be attached. At spaced intervals, depending on the distance between rows, a clamp 6 is secured to the beam 5, whereby a separate blade 28, and the means for connecting the blade to the beam described herein, may be attached to the beam, one blade per row.

Preparatory to use, the blade 28 is adjusted for use on level, ridge, or lister furrow rows, as the case may be, by vertically adjusting the standard 15 in the manner hereinbefore described.

Similarly, adjustment may be made as to the desired angle that the blade 28 should bear to the ground. This is achieved by loosening the lock screw 10, swinging the standard 15, held by the two-way clamp, around the extension arm 8 until the desired angle is obtained, and again tightening the lock screw.

As the rotary blade 28 is drawn down a row, the sharpened edge thereof chops or cuts the plants, grass, and weeds, with the indentations 32 permitting the blade to pass over plants at spaced intervals, leaving them unharmed, thereby efficiently thinning and cultivating the rows without the need of additional man power or other machinery. In topping sugar beets, the sharpened peripheral edge of the blade 28 cuts or chops the plants as hereinbefore described, while the sharpened edges of the indentations 32 pass over the plants which are to be left standing, at the same time efficiently removing the tops therefrom.

What is claimed is:

In a cultivator a disc formed marginally with wide shallow indentations spaced widely apart to define between them wide peripheral blades, the outer edges of said blades being arcuate and being struck on a common center, said outer edges being sharpened to provide cutting knives, said indentations each being approximately L-shaped and having one short edge disposed substantially radially of the disc and defining the leading edge of the blade next following said indentation, the other edge of the indentation intersecting the short edge at an obtuse angle and extending in a gradual curve struck oppositely to and intersecting with the outer edge of the blade next preceding the indentation, to define the trailing edge of said next preceding blade.

THOMAS H. MAYFIELD.

REFERENCES CITED

The following references are of record in the file of this patent:

UNITED STATES PATENTS

| Number | Name | Date |
| --- | --- | --- |
| 200,114 | Whitney | Feb. 5, 1878 |
| 361,698 | Hodgkins | Apr. 26, 1887 |
| 369,163 | Clark | Aug. 30, 1887 |
| 382,435 | Packer | May 8, 1888 |
| 1,113,940 | Arthur | Oct. 20, 1914 |
| 1,550,342 | Cogley | Aug. 18, 1925 |
| 1,622,865 | Franke | Mar. 29, 1927 |
| 1,625,087 | McClintock | Apr. 19, 1927 |
| 2,008,742 | Benjamin | July 23, 1935 |
| 2,244,774 | Hewitt | June 10, 1941 |